(No Model.)

P. J. VANDERLINDA.
REFRIGERATOR.

No. 493,410. Patented Mar. 14, 1893.

WITNESSES:
H. M. Dickinson
Lenna F. Dillenback

INVENTOR
Peter J. Vanderlinda
BY
Dennis L. Rogers
ATTORNEY.

United States Patent Office.

PETER J. VANDERLINDA, OF GRAND RAPIDS, MICHIGAN.

REFRIGERATOR.

SPECIFICATION forming part of Letters Patent No. 493,410, dated March 14, 1893.

Application filed December 22, 1892. Serial No. 456,101. (No model.)

*To all whom it may concern:*

Be it known that I, PETER J. VANDERLINDA, a citizen of the United States, residing at Grand Rapids, in the county of Kent and State of Michigan, have invented certain new and useful Improvements in Refrigeratory Apparatus; and I do hereby declare the following to be a full, clear, and exact description of the invention, such as will enable others skilled in the art to which it appertains to make and use the same.

Figure 1:
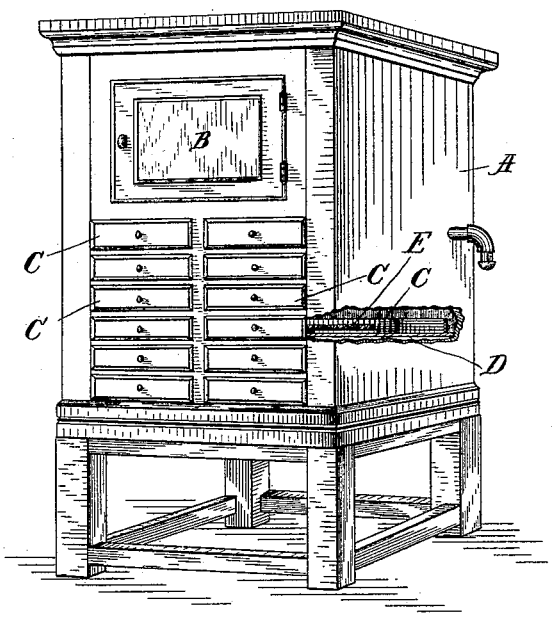
Figure 2:
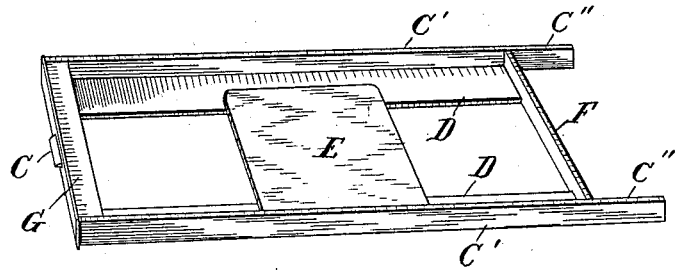

My invention relates to a refrigeratory apparatus and is designed more especially for cooling chocolate coated candies after they have received their coating of melted chocolate and consists in the construction combination and arrangement of the various parts hereinafter described and more particularly pointed out in the claim reference being had to the accompanying drawings wherein Figure 1. represents a perspective of a device embodying my invention, and Fig. 2. a detail of a tray frame and tray detached.

A. represents a casing which is divided horizontally into an ice chamber for storing ice, having a door B. and a cold air chamber for storing the material to be cooled arranged underneath the ice chamber, and provided with a series of tray frames C arranged horizontally and sliding in suitable ways, like a series of drawers in a case. Upon these tray frames, rest the trays containing the stock to be cooled as shown in Fig. 1. These tray frames are so constructed as to retain the cold air in the chamber, and yet to permit a free circulation thereof, having the front portion or piece C. and the interior front portion or piece G. which is of the same thickness as the walls of the cold air chamber, the side pieces C' back F. and bottom slats D. D. upon which the tray E. rests.

The stock to be cooled is placed upon the trays E. These trays are then set upon the slats D. D. and the frame is moved in its ways to its position at rest in the casing. The interior front piece G. filling the space or opening in the walls of the casing, acts as a stopper in preventing the escape of cold air from the chamber when the drawer is closed. When the stock is cooled, the frame is drawn forward until the back F. rests at the point formerly occupied by piece G. in the opening in the walls of the chamber, and being placed at some distance forward of the ends of pieces C' leaving projecting portions C''. C''. These projecting portions C'' C'' remain in the ways, to the rear of back F. and thus hold the drawer in a horizontal position while the trays are being changed, and the back F. stops the cold air from escaping while the drawer is open.

I claim—

The combination with the casing A. containing a cold air chamber, of a series of tray frames, arranged to slide horizontally therein, having a front portion C. an interior front portion G. side pieces C'. C'. and having a back F. arranged at some distance forward of the ends of pieces C' leaving projecting portions C''. C''. at the rear of said back and having bottom slats D. D. arranged substantially as described and for the purposes set forth.

In testimony whereof I affix my signature in presence of two witnesses.

PETER J. VANDERLINDA.

Witnesses:
    DENNIS L. ROGERS,
    H. M. DICKINSON.

Correction in Letters Patent No. 493,410.

It is hereby certified that Letters Patent, No. 493,410, granted March 14, 1893, upon the application of Peter J. Vanderlinda, of Grand Rapids, Michigan, for an improvement in "Refrigerators," were erroneously issued to said Vanderlinda as sole owner of the invention; that said Letters Patent should have been issued to said *Peter J. Vanderlinda and Herbert M. Dickinson, jointly*, each being owner of one-half interest, as shown by the record of assignments in this office; and that said Letters Patent should be read with this correction therein that the same may conform to the record of the case in the Patent Office.

Signed, countersigned, and sealed this 18th day of April, A. D. 1893.

[SEAL.]

JOHN M. REYNOLDS,
*Assistant Secretary of the Interior.*

Countersigned:
 JOHN S. SEYMOUR,
  *Commissioner of Patents.*